US010368170B2

(12) United States Patent
Kalhan et al.

(10) Patent No.: US 10,368,170 B2
(45) Date of Patent: Jul. 30, 2019

(54) SMART HEADSET AND METHOD OF ROUTING SERVICE IN RESPONSE TO PROXIMITY TO MOBILE DEVICE

(71) Applicant: Kyocera Corporation, Kyoto (JP)

(72) Inventors: Amit Kalhan, San Diego, CA (US); David Comstock, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/564,403

(22) PCT Filed: Apr. 18, 2016

(86) PCT No.: PCT/US2016/028128
§ 371 (c)(1),
(2) Date: Oct. 4, 2017

(87) PCT Pub. No.: WO2016/168829
PCT Pub. Date: Oct. 20, 2016

(65) Prior Publication Data
US 2018/0139315 A1 May 17, 2018

Related U.S. Application Data

(60) Provisional application No. 62/187,980, filed on Jul. 2, 2015, provisional application No. 62/149,154, filed on Apr. 17, 2015.

(51) Int. Cl.
*H04R 5/04* (2006.01)
*H04R 5/033* (2006.01)
(Continued)

(52) U.S. Cl.
CPC ............ *H04R 5/04* (2013.01); *H04M 1/6066* (2013.01); *H04R 5/033* (2013.01); *H04R 25/55* (2013.01);
(Continued)

(58) Field of Classification Search
CPC ...... H04M 1/6066; H04W 4/80; H04R 5/033; H04R 5/04; H04R 2227/003; H04R 25/55;
(Continued)

(56) References Cited

U.S. PATENT DOCUMENTS

2008/0101279 A1    5/2008  Russell et al.
2009/0104940 A1*   4/2009  Seshadri ................ H04M 1/05
                                                                 455/563
(Continued)

FOREIGN PATENT DOCUMENTS

JP    2009-165192 A    7/2009

*Primary Examiner* — Joshua Kaufman

(57) ABSTRACT

A smart headset communicates through the cellular transceiver with a cellular network when the smart headset in a first mode and communicates through a Bluetooth transceiver with a smart handset when the smart headset is in a second mode. A controller of the smart headset is configured to place the smart headset in the first mode when the smart handset is determined to be farther than a maximum proximity from the smart headset and configured to place the headset in the second mode when the smart handset is determined to be within the maximum proximity to the smart headset.

16 Claims, 11 Drawing Sheets

(51) Int. Cl.
*H04R 25/00* (2006.01)
*H04W 4/80* (2018.01)
*H04M 1/60* (2006.01)
*H04W 4/02* (2018.01)
*H04W 40/38* (2009.01)
*H04L 29/06* (2006.01)

(52) U.S. Cl.
CPC .............. *H04W 4/023* (2013.01); *H04W 4/80* (2018.02); *H04W 40/38* (2013.01); *H04L 69/22* (2013.01); *H04R 2227/003* (2013.01)

(58) Field of Classification Search
CPC .............. H04R 25/554; H04R 2225/51; H04R 2225/55
See application file for complete search history.

(56) References Cited

U.S. PATENT DOCUMENTS

2013/0297958 A1\* 11/2013 Siegel ..................... G06F 1/325
 713/323
2014/0364059 A1   12/2014 Dua \* cited by examiner

SMART HEADSET AND METHOD OF ROUTING SERVICE IN RESPONSE TO PROXIMITY TO MOBILE DEVICE

CLAIM OF PRIORITY

The present application claims priority to Provisional Application No. 62/149,154 entitled "Service Routing With Device Manager," filed Apr. 17, 2015, and to Provisional Application No. 62/187,980 entitled "Proximity Detection Based on UE Mode Switch Signaling," filed Jul. 2, 2015, which are assigned to the assignee hereof and hereby expressly incorporated by reference in its entirety.

REFERENCE TO CO-PENDING APPLICATIONS FOR PATENT

The present application relates to PCT Application, entitled "DEVICE MANAGER FOR SERVICE ROUTING," PCT/US16/28132, filed concurrently with this application, and assigned to the assignee hereof and expressly incorporated by reference herein.

FIELD

This invention generally relates to wireless communications and more particularly to a smart headset and service routing based on a proximity to a mobile device.

BACKGROUND

A user of communication devices may have access to multiple devices that can deliver the same service or application. It is also possible for the particular service to be routed through different paths through a communication system including multiple wireless technologies. For example, a user may own a cellular communication device capable of providing voice communication through a cellular network and may also have a telephone handset capable of establishing voice communication through a packet network such as the Internet.

SUMMARY

A smart headset communicates through the cellular transceiver with a cellular network when the smart headset in a first mode and communicates through a Bluetooth transceiver with a smart handset when the smart headset is in a second mode. A controller of the smart headset is configured to place the smart headset in the first mode when the smart handset is determined to be farther than a maximum proximity from the smart headset and configured to place the headset in the second mode when the smart handset is determined to be within the maximum proximity to the smart headset.

DETAILED DESCRIPTION

In certain situations, it may be useful or beneficial to switch service of a currently active application from a one user device to another user device. In addition to changing the device that the user utilizes to access the application, the communication path for the application is changed from a first communication path to the first user device to a second communication path to the second user device where the two communication paths use at least some communication system infrastructure that is different. For example, when arriving home, a user may want to transfer a currently active voice call on a cellular handset to a smart TV and continue the call through the smart TV. Since the smart TV is likely connected to the network through an Internet connection provided by electrical or fiber optic cable, migrating (transferring) the active call requires establishing a connection link (path) to the voice call application server from the smart TV through the cable connection and disconnecting the call from the cellular handset through the cellular network. In accordance with the techniques discussed below, a device manager manages service routing between devices efficiently and intelligently based on changes in proximity between user devices associated with a defined device group. In addition to the proximity changes, the device manager may evaluate any combination of other factors, circumstances, settings (such as user preferences), signal quality, communication path quality/capabilities, application type, number and types of devices associated with the user, and dynamic user input. As discussed below, the device manager may be implemented within an entity on the network such as server, implemented within and distributed over user devices, or implemented within both devices and a network entity. Although the device manager can be implemented in any network layer, the device manager is implemented within the application layer for the examples discussed herein.

Figure 1:
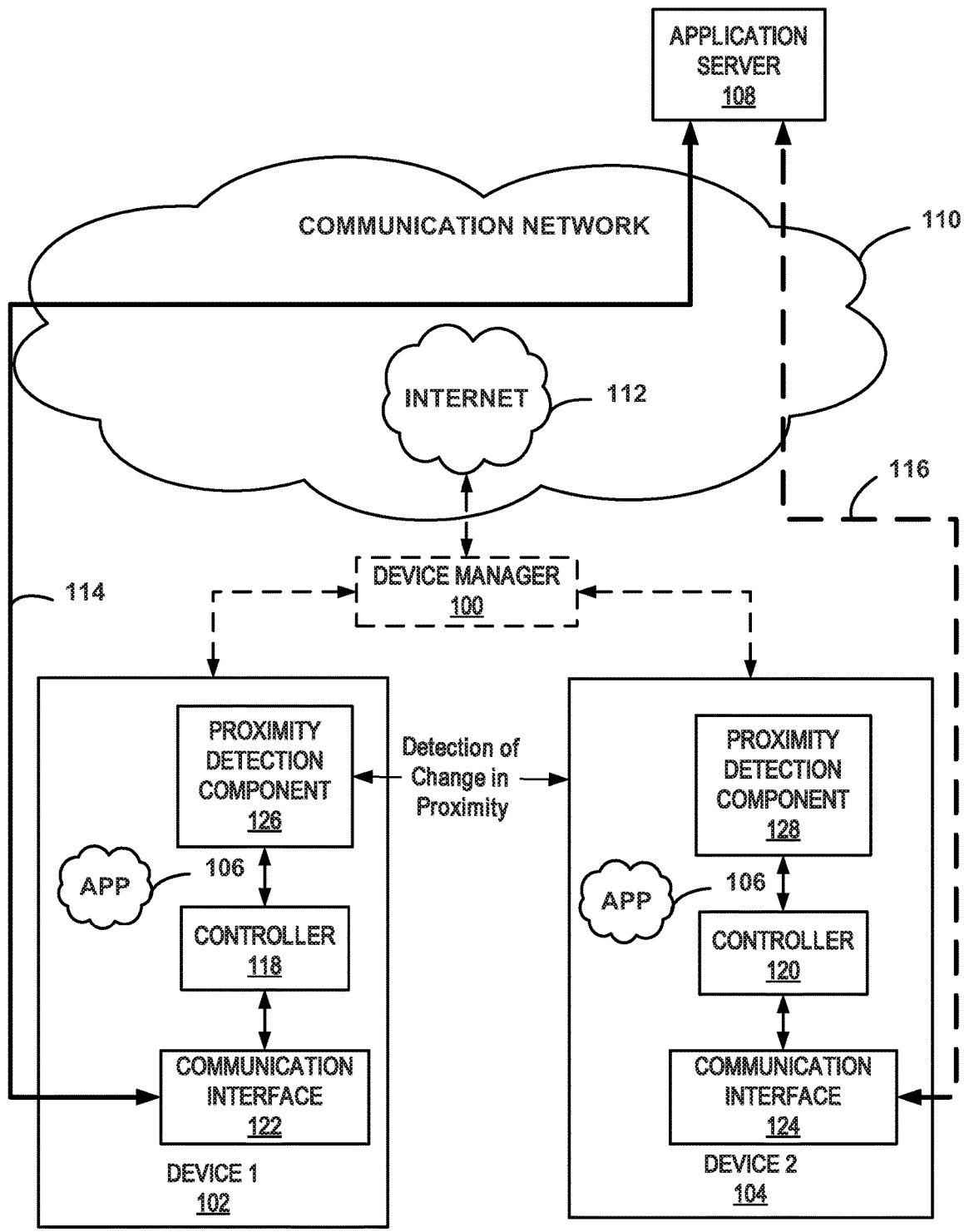
FIG. 1 is a block diagram of a communication system including a device manager that is configured to reroute communication for an active application on a first user device to a second user device.

FIG. 1 is a block diagram of a communication system 10 including a device manager 100 that is configured to reroute communication for an active application on a first user device 102 to a second user device 104. The devices 102, 104 are associated with each other in some way. For the example, the devices 102, 104 belong to, and are accessible by, the same user. The devices 102, 104, therefore, are within a defined user group. Each device has the hardware and code to enable running an application 106 that accesses an application server 108 through a communication network 110. The communication network 110 may include any combination of hardware, firmware, and backhaul that facilitates communication between the devices 102, 104 and the application server 108. For the example, the communication network 110 includes at least the Internet 112, infrastructure for enabling a first communication path 114 from the first device 102 to the application server 108 and infrastructure for a second communication path 116 from the second device 104 to the application server 108. As explained below, the infrastructure may include any combination of wired and wireless networks and systems. The communication network, therefore, may include several networks such as virtual private networks (VPNs), cellular networks, Local Area Networks (LANs), Wireless LANs (WLANs), Internet networks, Wi-Fi networks and other communication networks. In some situations, the same network infrastructure may be used for the two communication paths, 114, 116. Such a situation occurs, for example, where the two devices access the network through the same eNB of a cellular communication network.

The device manager 100 is illustrated with a dashed box to indicate that the device manager 100 may be implemented within and distributed over the devices 102, 104 or may be implemented within an entity connected to or within the network 110. Examples of distributed and network implementations are discussed below. The device manager 100 includes any combination of hardware, software and/or firmware that facilitate the functions described herein. For the examples, the device manager 100 has access to information regarding the devices associated within a group, the quality of communication links, any user preferences and any other factors, characteristics, or circumstances necessary for the device manager to make the particular routing decisions. The device manager also can be remotely controller using one of the devices to activate a service on any other device or to override an activation of an application on a particular device. For example, if a voice call would otherwise be transferred from a handset to a smart TV based on conditions perceived by the device manager, the user may stop the transfer to keep the call on the handset. The device manager stores information about each device as well as user preferences in order to categorize the devices and make intelligent decisions regarding service routing. For example, if the user prefers not to have certain calls to be transferred from a handset to the smart TV, the user may provide preferences regarding how the smart TV responds to a call page. Depending on the particular implementation, the preferences may range from general rules to specific conditions based on several factors or conditions. For example, preferences can be set for all calls or for particular incoming calls from designated numbers, during particular times of day, and whether other persons are present at the location. These configurations are saved in the device manager 100.

Each device includes at least a controller 118, 120 with a memory and a communication interface 122, 124. At least one of the devices involved in a rerouting procedure also includes a proximity detection component 126, 128. For the example of FIG. 1, the first device (Device 1) and the second device (Device 2) each include a controller 118, 120, a communication interface 122, 124 and a proximity detection component 126, 128. The controllers include any combination of hardware, software, and/or firmware for executing the functions described herein as well as facilitating the overall functionality of the respective device. An example of a suitable controller includes code running on a microprocessor.

Each communication interface 122, 124 includes a combination of hardware, software, and/or firmware that enables communication using at least one communication technology. A communication interface 122, 124, however, may be capable of communicating with multiple communication technologies and formats. A communication interface, therefore, may include any number of transmitters, receivers, and wired communication interfaces. Examples of communication interfaces include cellular transceivers, Wi-Fi transceivers, Bluetooth transceivers, and Local Area Network (LAN) transceivers (e.g., Ethernet interface).

The proximity detection component 126, 128 is any combination of electronics, detection devices, and/or sensing devices that provide information allowing the controller to identify a change in proximity between the device and at least one other device. For the examples herein, the proximity detection component 126, 128 may include any number of user identification sensing devices, proximity evaluation devices, and/or location determination devices. Examples of user identification sensing devices include facial recognition sensors, retinal recognition devices, speech recognition devices finger print recognition devices, and other biometric evaluation devices. The user identification sensing device may also include a keyboard, or other user interface, that allows the user to enter a passcode or other unique information allowing the controller to identify the user. Examples of proximity evaluation devices include radio receivers capable of receiving or detecting signals such as cellular, WLAN, Wi-Fi, RFID, NFC, Bluetooth, and Zig-bee signals. Detection of cellular signals may be performed by detecting uplink cellular signals transmitted by another device. As discussed below, the detection of cellular signals may be the detection of device-to-device (D2D) signals. For one example, the detection includes the detection of D2D discovery signals. The proximity detection component may be capable of detecting several different types of signals in some circumstances. Examples of location determination devices include devices that use GPS, cellular and WLAN location services. The proximity detection component, therefore, includes one or more user identification sensing devices, proximity evaluation devices, and/or location determination devices that obtain information used by the controller to determine that a change in proximity to one more other devices has occurred.

The detected change in proximity may be a determination that another device has come closer to the device or it may be a determination that another device has moved farther away. Also, the change in proximity may be determined directly from information provided by the proximity detection component or may be inferred or indirectly determined. For example, where the proximity detection component includes a GPS module, the determination that the user has arrived at particular location, such the user's residence, may be evaluated to determine that the user the first device carried by the user has come closer to a second device within the residence. In another example of indirect proximity change determination, the proximity detection component within a fixed device at a particular location includes a user identification sensor, such as retinal scanner, that identifies the presence of the user at the particular location. In response to the identification of the user at the location facilitating, the controller determines that a mobile device typically carried by the user has come closer to the fixed device at the location. Such a situation may occur where the fixed device is a smart TV with a retinal scanner at the user's residence and the mobile device is a cellular handset.

The proximity change determination may be based on direct detection/sensing of other devices. In some situations, a change in proximity may be based on a combination of direct detection and indirect detection. Some examples of direct sensing techniques include detecting a change in proximity to another device based on the signal strength and/or signal quality of radio signals transmitted by the device. Examples of suitable radio signals that can be monitored include cellular, Wi-Fi, Bluetooth, RFID, NFC, and Zig-bee signals. In addition to evaluating characteristics of the signals, the proximity detection component may detect the content transmitted within a radio signal to determine a change in proximity. For example, if a particular device transmits unique content that is associated with the device, other devices may receive the signal, decode the content and determine that the transmitting device is near.

The various functions and operations of the blocks described with reference to devices 102, 104 in FIG. 1 may be implemented in any number of devices, circuits, or elements. Two or more of the functional blocks may be integrated in a single device, and the functions described as performed in any single device may be implemented over several devices. For example, a receiver in the communication interface may be used as part of the proximity detection component.

The various functions and operations of the blocks described with reference to devices network entities and in FIG. 1 may be implemented in any number of entities, servers, devices, circuits, or elements. Two or more of the functional blocks may be integrated in a single device, and the functions described as performed in any single device may be implemented over several devices. For example, the device manager and the application may be implemented with the same network entity.

In the example of FIG. 1, the first device 102 is running an application 106 that requires a connection to the application server 108. The connection is a communication path 114 through infrastructure and network components within the communication network 110. For example, the first device 102 may be running a voice application where a call is established with a voice application server through cellular communication infrastructure such as a base station connected within a cellular network. The first device 102 detects that the proximity to the second device has changed. For example, the proximity detection component 126 may detect a Bluetooth signal transmitted by the second device 104 resulting in the controller 118 determining that the second device 104 is near the first device 102. Information regarding the change in proximity is provided to the device manager 100. The device manager 100 evaluates the change in proximity as well as other information related to the devices, connections, user preferences, configurations, and any other predetermined criteria for determining whether the application should be migrated (transferred) from the first device 102 to the second device 104. Based on the criteria and information available to the device manager 100, the device manager 100 determines that the application should be transferred to the second device 104. For example, the second device 104 may be a home telephone connected to an internet protocol (IP) packet network where the device manger 100 determines that the currently active voice call on the first device (cellular handset) 102 should be transferred to the home telephone. The determination may be based on criteria such as the user's preference to use the home telephone over the cellular handset when the user is home and the connection quality to the application server through the network. Based on the evaluation of the criteria and conditions, the device manager 100 determines that the call should be transferred and initiates the transfer by notifying the network currently handling the active call for the first device or by steering the voice call to the second device. In one scenario, paging and call establishment messages are exchanged between the devices and networks in accordance with the requirements of the particular networks involved. As a result, the active application is transferred (migrated) from the first device 102 and the first communication path 114 to the second device 104 and the second communication path 116. The application continues on the second device.

Figure 2:
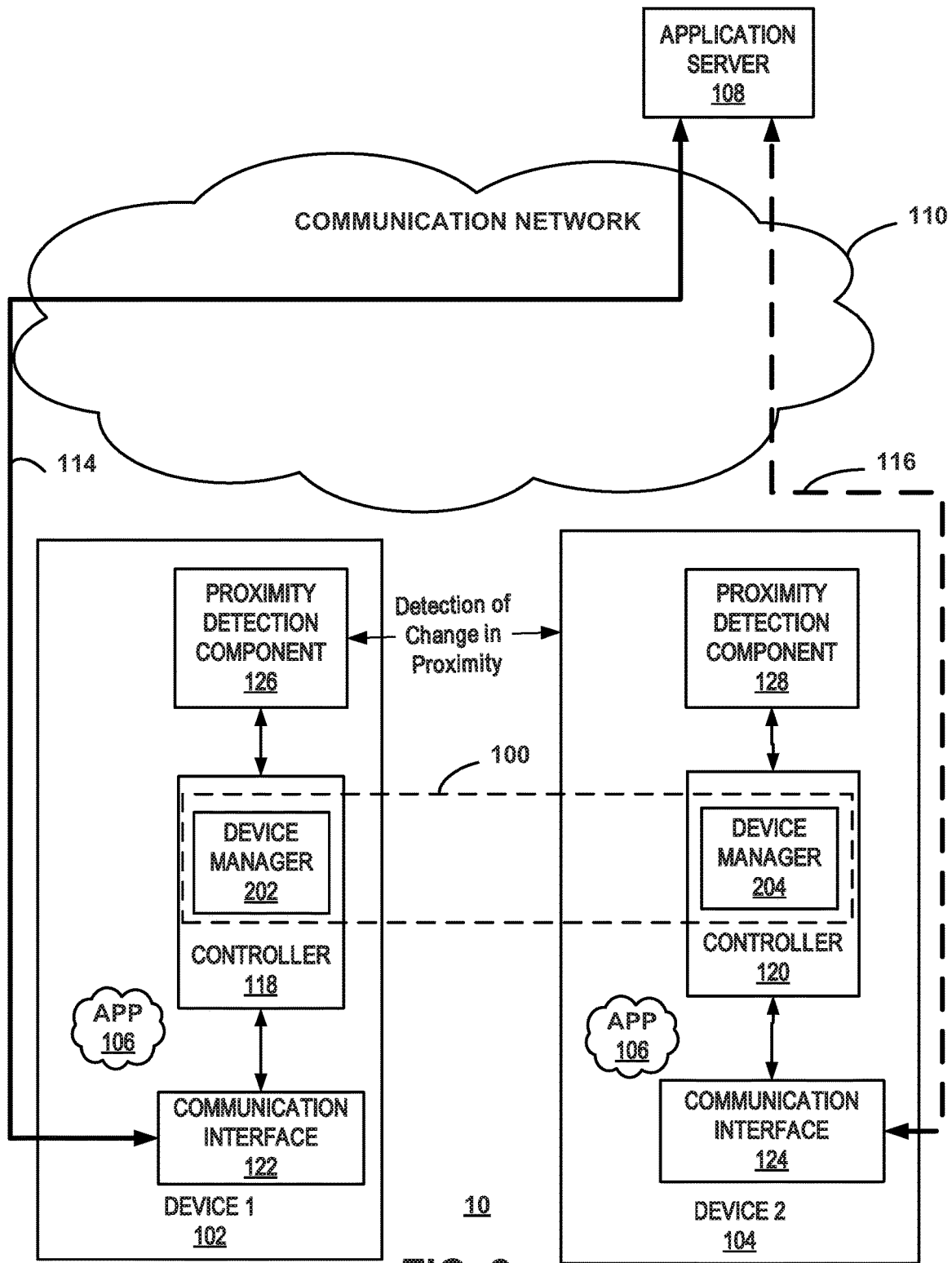
FIG. 2 is a block diagram of the communication system where the device manager 100 is implemented within, and distributed over, the devices.

FIG. 2 is a block diagram of the communication system 10 where the device manager 100 is implemented within, and distributed over, the devices 102, 104. For the example, a local device manager 202, 204 is running on each of the devices 102, 104. The device manger 100 in the example of FIG. 2 is formed by the local device managers 202, 204. A suitable implementation of a local device manager includes running software and/or firmware on the controller of the device. The device manager 100, therefore, is an entity installed in all the devices within a group by installing a local device manager on each device of the group. For the examples herein, only devices within a group can have services routed from one device to another. An example of a device group is a group consisting of all the devices belonging to the same user. Each local device manager 202, 204 carries a list of all the other devices in the group. When a device registers into the device manager as a "partner device" then all the partner devices get an updated list with the addition of the new device. The device which is currently running the application is assigned as the master for that particular application. As a result, one device (one local device manager) may be the master of one application and another device (another local device manager) may be the master of another application. Each master local device manager informs other devices that it is currently the master of a particular application. The master device determines what other local master device will take over the application as master when the application is transferred to another device and service is rerouted. When the first device releases control of the application to the second device, the first device is no longer the master of the application.

All device managers within a group ping each other to ensure there is no radio link failure (RLF). For example, a ping may be initiated by one device by sending a pre-configured or pre-defined sequence to other devices within the group and upon reception of the sequence, an ACK is sent. A device preferably only sends the pre-configured or pre-defined sequence if it is still connected to the network and the ACK should only be sent if the responding device is also still connected to the network. The rate of pinging may depend on the type of application being used and is configurable. The rate of pinging may also depend on the type of application being used. The pinging may be routed through the network to ensure network connectivity. Alternatively, a first device may also ping a second device directly. For example, where two user equipment devices (UE devices) are operating in a system that supports Device-to Device (D2D) communication, one device may ping the other device using D2D communication and/or D2D Discovery. In such a scenario, for the examples herein, the second UE device informs the first UE device whether it is still connected to the network. If there is an RLF, one of the device managers volunteers to take over control and requests the application server to reroute the traffic towards the new device or the local device manager associated with the new device. As a result, the new device becomes the master for the associated application. If multiple devices simultaneously request to be the master of the application, the local device managers may randomly select a master using predefined protocol or the application server 108 may select the master. Subsequently, the master of this application should inform the other devices within the group of the change. The RLF may additionally or alternatively, be tracked by the network where the network is aware of devices that have experienced RLF. The network may send the RLF information to the device manager in some circumstances.

Figure 3:
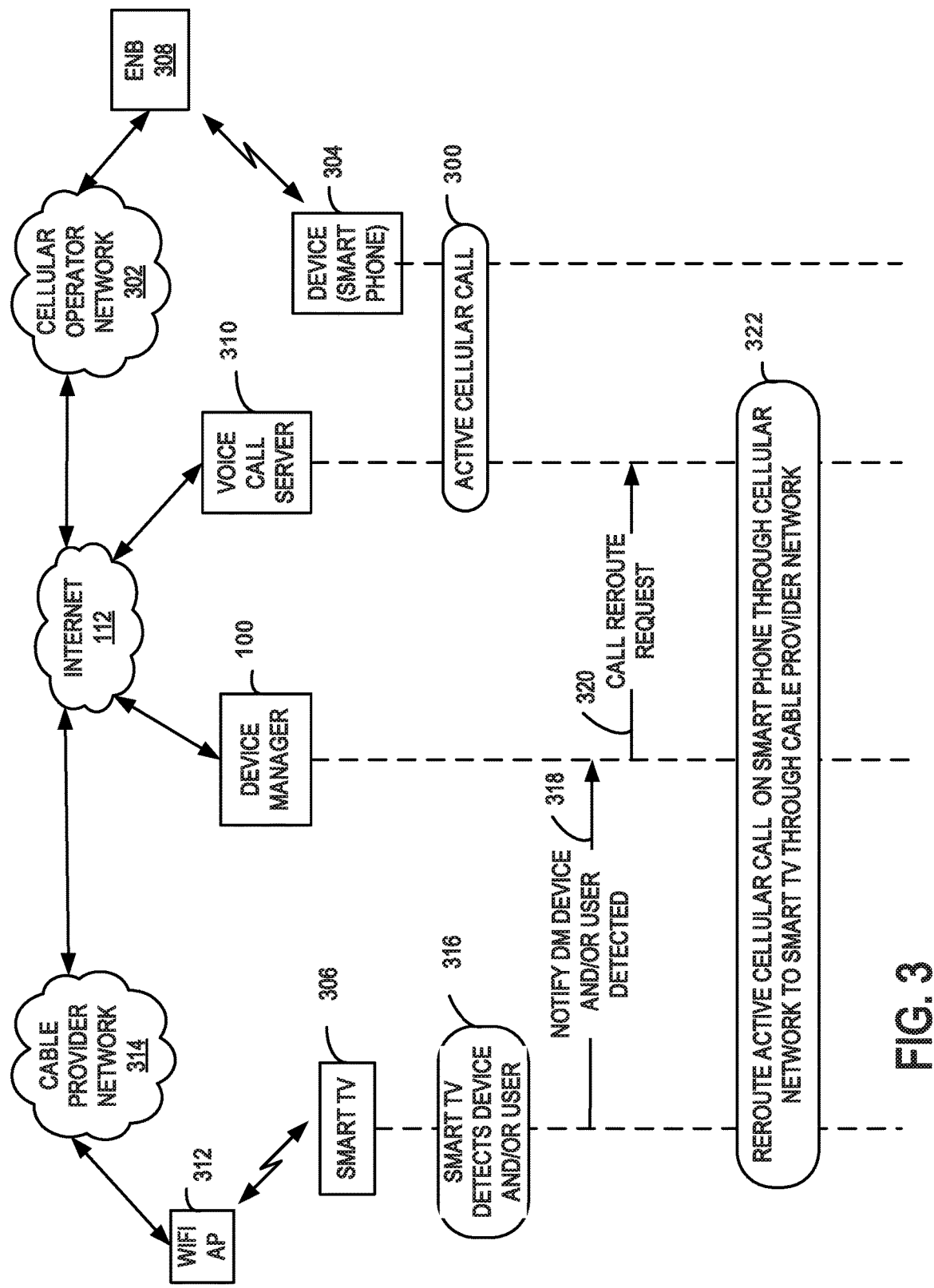
FIG. 3 is a block diagram of an example where the active application is a voice call on a cellular network that is rerouting from a cellular device to a smart TV.

FIG. 3 is a block diagram of an example where the active application is a voice call 300 on a cellular network 302 that is rerouted from a cellular device 304 to a smart TV 306. For the example of FIG. 3, a user is on an active call 300 with a cellular device (e.g. smart phone) that is accessing the cellular network 302 when a smart TV 306 determines that a change in proximity has occurred. The determination may be based on a detection of the user or detection of the cellular device 304. For example, the smart TV 306 may include a biometric reader that can identify the user and allow the smart TV 306 to determine that the user is near the smart TV 306. In other situations, the smart TV may detect a signal from the cellular device 304 and determine that the cellular device 304 is near. Therefore, as discussed above, the proximity detection component 126 determines that the cellular device 304 is near the smart TV 306. In response to the proximity change, the device manager 100 evaluates the current situation in accordance with the programmed criteria and preferences and reroutes the active call if warranted. The situation described with reference to FIG. 3, therefore, is an example of the system in FIG. 1 where the cellular device 302 is the first device 102 and the smart TV 304 is the second device 104.

The cellular device 304 communicates with an eNB 308 or base station to facilitate the cellular call that includes a communication path through the eNB 308, the cellular network 302, and the Internet 112 to a voice call server 310. Accordingly, the voice call server 310 is an example of the application server 108 of FIG. 1. The smart TV 306 is connected to the network 110 through a Wi-Fi access point 312 and a cable provider network 314. The cable provider network 314 is connected to the Internet 112 and, therefore, provides Internet access to the smart TV. Since the device manager 100 is connected to the Internet, the smart TV 306 can communicate with the device manager 100.

While the voice call 300 is active, the smart TV 306 detects a change in proximity between the cellular device 304 and the smart TV 306. The smart TV 306, for example, may detect the user has come home based on a retinal scan. At event 316, therefore, the smart TV 306 determines that the cellular device 304 is within a maximum proximity of the smart TV 306. In response, the smart TV 306 notifies the device manager 100 that the cellular device 304 is nearby at transmission 318. The device manager 100 evaluates the current conditions as well as the preferences and rerouting rules for the particular user and determined if the active call should be rerouted. In response to determining that the call should be rerouted, the device manager 100 sends a call reroute request transmission 320 to the voice call sever 310. In response, the voice call server 310 in cooperation smart TV, cellular device 306 and the cellular operator network 302, reroutes the active call to the smart TV 306. The new communication path for the rerouted call is between the smart TV 306 and the voice call server 310 and includes the Wi-Fi air interface between the access point 312 and smart TV 306, the cable provider network 314 and the Internet.

Figure 4:
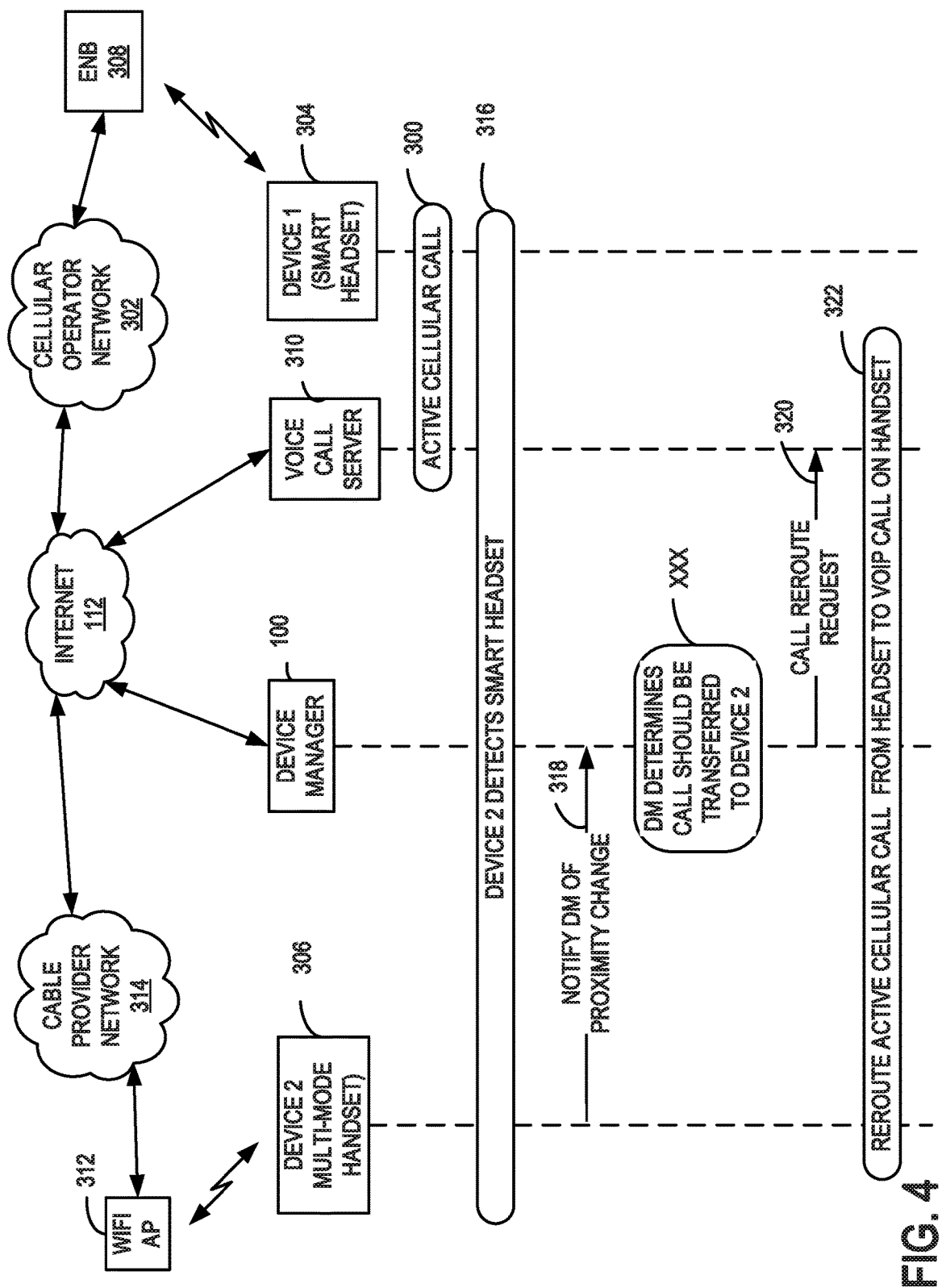
FIG. 4 is a block diagram of the system for an example where the active application is a voice call on a cellular network that is rerouted from a cellular smart headset device to a multimode device (Wi-Fi-cellular handset).

FIG. 4 is a block diagram of the system 10 for an example where the active application is a voice call 400 on a cellular network 302 that is rerouted from a cellular smart headset device 402 to a multimode device (Wi-Fi-cellular handset) 404. For the example of FIG. 4, a user is on an active call 400 with a cellular smart headset 402 that is accessing the cellular network 302 when a multimode handset 404 determines that a change in proximity has occurred. The multimode handset 404 is a device such as a cellular user equipment (UE) device that can access Wi-Fi networks and cellular networks. The smart headset 402 is a headset that can directly access cellular networks and can also be used as a peripheral headset device that communicates with another device that accesses a network. Therefore, the smart headset 402 may operate in a first mode where it is a standalone cellular phone and may operate in a second mode where it is a wireless (e.g., Bluetooth) headset wirelessly communicating with a smartphone, cell phone, multimode device, or other UE device. An example of a suitable smart headset is discussed with reference to FIG. 10 below. For the example, the multimode handset 404 detects a signal transmitted by the smart headset 402 such a Bluetooth signal and, based on the signal, determines the smart headset 403 is a member of the same user group and is sufficiently close for communication with the multimode handset 404. The multimode handset 404 sends a transmission 406 to the device manager 100 to notify the device manager 100 of the change in proximity to the smart headset 402.

In response to the proximity change, the device manager 100 evaluates the current situation in accordance with the programmed criteria and preferences and reroutes the active call if warranted. The situation described with reference to FIG. 4, therefore, is an example of the system in FIG. 1 where the smart headset 402 is the first device 102 and the multimode device 404 is the second device 104.

The smart headset 402 communicates with an eNB 308 or base station to facilitate the cellular call that includes a communication path through the eNB 308, the cellular network 302, and the Internet 112 to a voice call server 310. Accordingly, the voice call server 310 is an example of the application server 108 of FIG. 1. The multimode device 404 is connected to the network 110 through a Wi-Fi access point 312 and a cable provider network 314. The cable provider network 314 is connected to the Internet 112 and, therefore, provides Internet access to the multimode device 404. Since the device manager 100 is connected to the Internet, the multimode device 404 can communicate with the device manager 100.

While the voice call 300 is active, the multimode device 404 detects a change in proximity between the smart headset 402 and the multimode device 404. The multimode device 404, for example, may detect a wireless signal transmitted by the smart headset. At event 406, therefore, the multimode device 404 determines that the smart headset 402 is in proximity of the multimode device 404. In response, the multimode device 404 notifies the device manager 100 that the smart headset 402 is nearby with the notification transmission 408. At event 410, the device manager 100 evaluates the current conditions as well as the preferences and rerouting rules for the particular user and determines whether the active call should be rerouted. In response to determining that the call should be rerouted, the device manager 100 sends a call reroute request transmission 412 to the voice call sever 310. In response, the voice call server 310 in cooperation multimode device, smart headset, and the cellular operator network 302, reroutes the active call to the multimode device 404 at event 414. The new communication path for the rerouted call is between the multimode device 404 and the voice call server 310 and includes the Wi-Fi air interface between the access point 312 and multimode device 404, the cable provider network 314 and the Internet 112.

The example of FIG. 4 is just one of numerous scenarios where a device manager transfers service to another device in a group during an active call or application session. The scenario of FIG. 4 may occur where the user is outside their residence on an active cellular call using the smart headset. The multimode device 404 is located at the residence and when the user returns home during an active call, the call is rerouted to the multimode device 404. The user can continue to use the headset as a peripheral device to the multimode handset 404. In some situations, the transfer is completely transparent while in other situations, the user may override the transfer to keep the call on the cellular smart headset. Another scenario including a smart handset and UE device may include rerouting the active call from the UE device to the UE headset when the headset has moved too far away from the UE device.

Although the device manager 100 is illustrated outside of the cellular communication network 302 in FIG. 4, the device manager 100 may be part of the cellular network in some situations. As a result, the device manager 100 may be integrated with the and control functions of the network and may be accessed using cellular network protocols.

In some situations, rules or preferences may be applied in determining whether the network is informed of a proximity change. For example, the smart handset may not notify the network of a detected proximity change when a battery power level is below a threshold. When the battery is at low power, it may be preferred that service is not transferred to the smart handset but remain with the smart headset.

In another example, the smart headset and the smart handset may be configured such that the smart headset is responsible for notifying the network of a proximity change. Such a configuration may be useful to avoid transition of service from the smart headset to the smart handset when the user does not have the smart handset in hand.

Although the example of FIG. 4 includes the transfer of an active call, transitions for service from one device to another may be limited to only when there are no active calls. Therefore, the techniques discussed herein may be applied to assign an a currently inactive application from one device to another device for the next active session.

Figure 5:
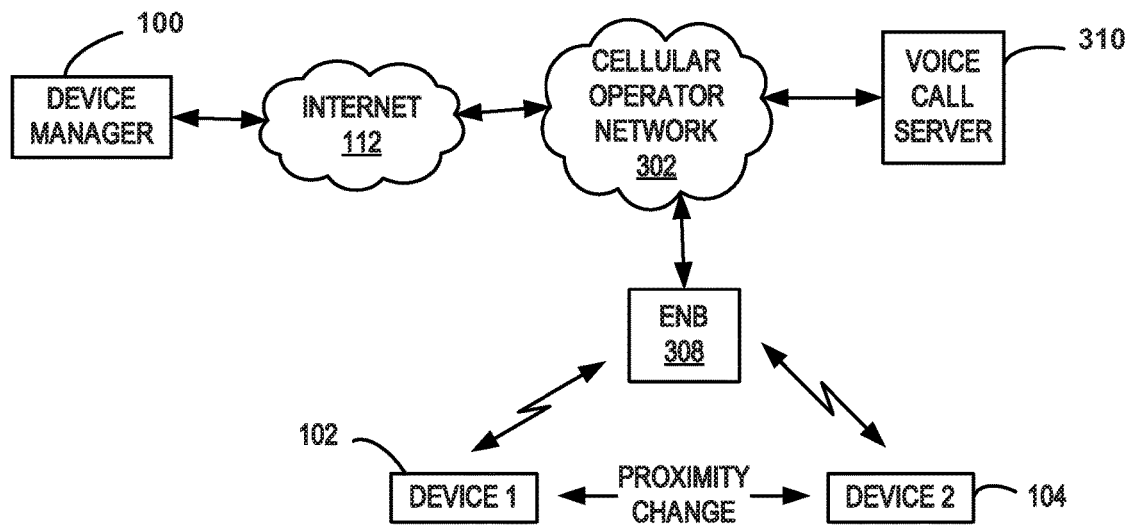
FIG. 5 is a block diagram of the system for an example where the first device and the second device access the network through the same eNB of a cellular network.

FIG. 5 is block diagram of the system for an example where the first device and 102 the second device 104 access the network 110 through the same eNB 308 of a cellular network 302. For the example of FIG. 5, service is rerouted from the first device 102 to the second device 104 through the same eNB 308 in response to a change in proximity of the first device 102 to the second device 104.

Figure 6:
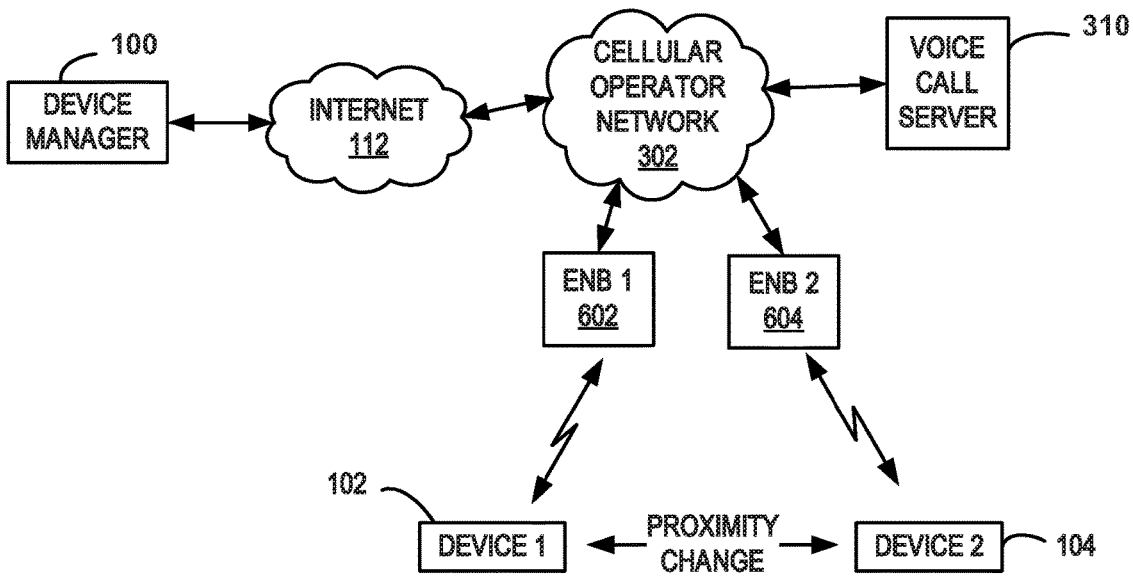
FIG. 6 is a block diagram of the system for an example where the first device and the second device access the network through different eNBs of a cellular network.

FIG. 6 is block diagram of the system for an example where the first device 102 and the second device 104 access the network 110 through the different eNBs 602, 204 of a cellular network 302. For the example of FIG. 6, the first device 102 communicates through the cellular network 302 through a first eNB 602 and the second device communicates through the cellular network through the second eNB 604. Service is rerouted from the first device 102 to the second device 104 through the different eNBs in response to a change in proximity of the first device 102 to the second device 104. The eNBs 602, 604 may be part of the same provider network or may be connected to different provider networks. Accordingly, the cellular operating network may include multiple operators in some situations.

Whether the devices are serviced by the same eNB as in FIG. 5 or if serviced by different eNBs as in FIG. 6, the transfer of service generally includes proximity detection, proximity notification, RLF evaluation, device manager evaluation, and transfer of service. In some more specific examples of where both devices are D2D devices connected to an LTE network, the proximity notification may be performed after the devices have discovered each other and have established communication or may occur during the discovery process. In some circumstances, for example, the D2D devices have received discovery signals and have exchanged information confirming that the device to which service will be transferred has a suitable network connection. The devices communicate over D2D channels and, after the network connection confirmation (RLF evaluation), one of the device sends the proximity notification to the device manager to initiate the transfer.

In another example, the proximity notification is transmitted in response to receiving a D2D discovery signal from the other D2D device. In some circumstances, one D2D device voluntarily transmits D2D discovery signals and, in response to receiving a response from another D2D device, sends the proximity notification to the device manager. In such a situation, the response to receipt of the D2D discovery signal can be considered the proximity detection.

In some situations, a D2D device sends a request to another D2D device to takes over an application. Alternatively, one D2D device may volunteer to take over an application from another device and send a message requesting transfer of the application. For the examples herein, however, the final decision is made at the network in both cases.

Figure 7:
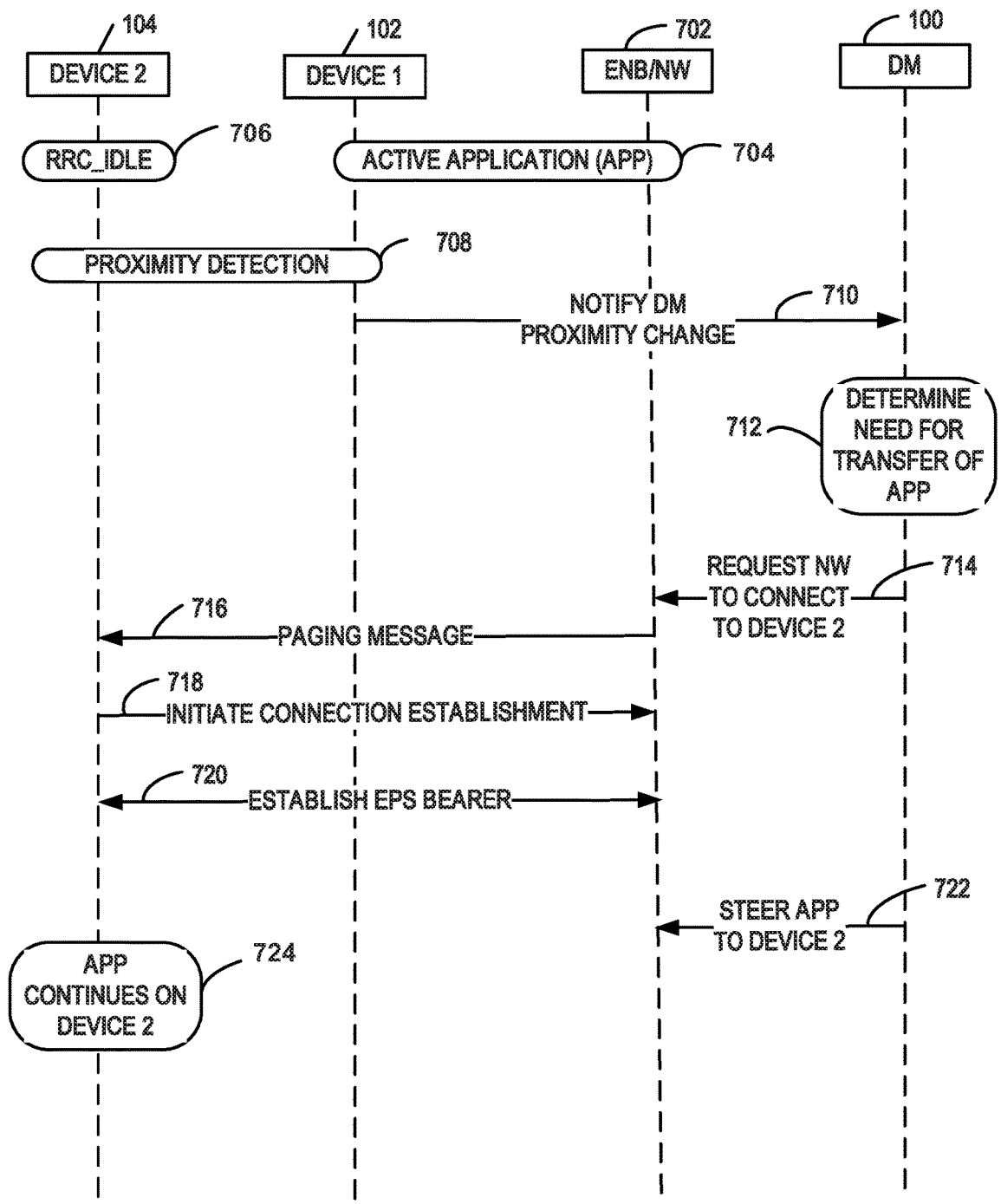
FIG. 7 is a message diagram for an example with device paging where the device manager is connected within or to the network and the devices are communicating with the network through the cellular network.

FIG. 7 is a message diagram for an example with device paging where the device manager 100 is connected within or to the network and the devices 102, 104 are communicating with a network 110 through the cellular network 302. The first device 102 and the second device 104 are communicating with the cellular network 302 and may be accessing the cellular network 302 through the same eNB 308 or different eNBs 602, 604. In situations where the devices are communicating with a single eNB, the messaging can be directed to/from the eNB which facilitates the rerouting of communication from the first device 102 to the second device 104. Where each device accesses the cellular network 302 through a different eNB 602, 604, the messaging is directed to the network which facilitates the rerouting of the communication from the first device through the first eNB to the second device through the second eNB. As a result, the eNB and cellular network are represented by a single block labeled "ENB/NW" 702. For the example of FIG. 7, the cellular network operates in accordance with at least one revision of the Third-Generation Partnership Project Long-Term Evolution (3GPP LTE) communication specification.

At event 704, at least one application is active on the first device 102 using the cellular network 702. Depending on the particular circumstances, there may be more than one active application on the first device 102. For the examples herein, service is rerouted and transferred to the second device for a single device and any other active application remains with the current serving device. In some situations, more than one application may be transferred. Also, no active applications are running on the second device for the examples. In some situations, the second device may have one or more running applications. These applications may be transferred to the first device under some circumstances when the application running on the first device is transferred to the second device.

At event 706, the second device is in the RRC_IDLE mode in accordance with the 3GPP LTE communication specification. In this mode and in accordance with LTE specifications, the UE device can receive broadcast or multi-cast data, monitors a paging channel to detect incoming calls, performs neighbor cell measurements and does cell selection as well as reselection and acquires system information.

At event 708, a change in proximity of the first device 102 to the second device 104 is detected. For the example, the first device 102 detects that the second device 104 has moved closer to the first device 102 and is within a maximum threshold proximity. In some situations, the detection of a change in proximity may be a detection that the devices have moved farther apart (e.g., a device can no longer be detected). Also, the second device may detect the change in proximity in some circumstances.

At transmission 710, the first device notifies the device manager of the detected change in proximity. For the example, a notification message is sent through the Internet. As discussed herein, the device manager may reside in the network or in the devices. As a result, the sending of a notification message is a logical representation in situations where the device manager is implemented within the devices.

At event 712, the device manager 100 determines whether there is a need to transmit the active application from the first device to the second device. The device manager 100 applies the rules, preferences, and information regarding the current conditions and circumstances to determine if the service should be rerouted to the second device. For the example of FIG. 7, the device manager 100 determines that the service should be transferred.

At transmission 714, the device manger sends a request to the cellular network 702 for the cellular network to connect to the second device. Depending on the specific application that is to be transferred, the request may be in the form of SIP signaling so that the specific application is transparent to the network and the SIP signaling triggers the network to page the second device.

At transmission 716, the cellular network 702 sends a paging message to the second device to initiate communication. For the example, the paging message is sent in accordance with at least one revision of the 3GPP LTE communication specification.

At transmission 718, the second device initiates connection establishment by sending information to the cellular network. The particular mechanism for sending the information may depend on the particular network. For example, connection establishment with an LTE network typically involves the need for a random access procedure for UE devices when in the Idle mode. This is necessary for resolving contention resolution, uplink timing alignment, resource allocation, security mode activation, and the cause for connection establishment.

At transmission 720, the cellular network 702, establishes the EPS bearer channels if not already established.

After the appropriate communication channels are established between the cellular network and the second device, the device manager 100 steers the application to the second device. An example of a suitable technique of steering the application includes defining elements within the header in addition to the conventional header of the IP packets used for the application. For such an example, three elements in the additional header are defined to represent the application identifier, a group identifier, and a device identifier. The header, therefore, includes an application ID, group ID, device ID. By relying on the conventional packet gateway (P-GW) for steering and rerouting of the IP packet, only the application layer within the device manager 100 and the devices 102, 104 needs to track and be aware of the additional header. For the examples herein, an application control layer is used by the device manager to inform the device to which the service has been transferred that the device is now the new master of the particular application that has been transferred. The application control layer is also used to inform the device from which service was transferred that it is no longer the master of the application. At event 724, the application continues on the second device.

Figure 8:
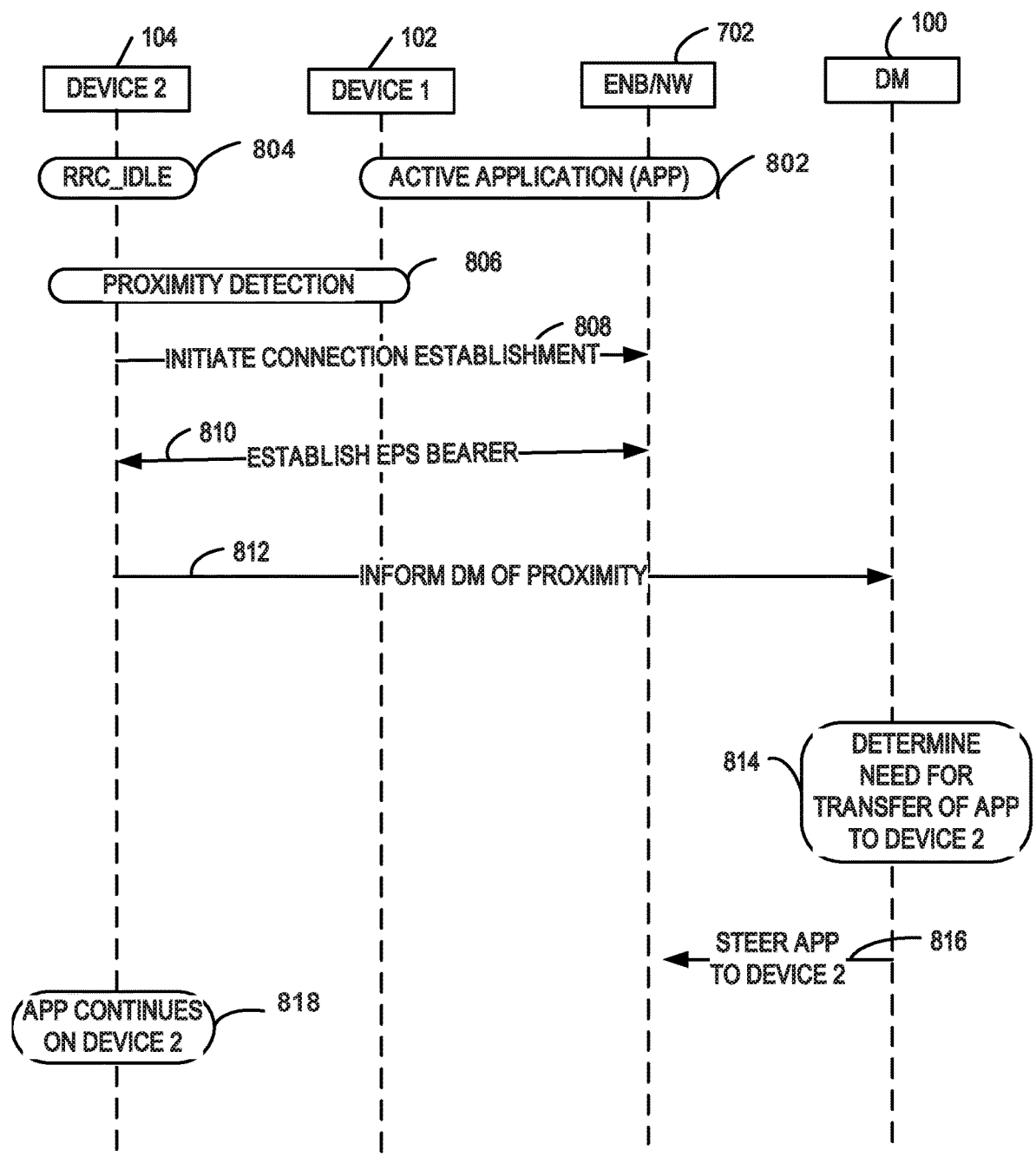
FIG. 8 is a message diagram for an example without device paging where the device manager is connected within or to the network and the devices are communicating with the network through the cellular network.

FIG. 8 is a message diagram for an example without device paging where the device manager 100 is connected within or to the network and the devices 102, 104 are communicating with the network 110 through the cellular network 302 (702). The first device and the second device are communicating with the cellular network and may be accessing the cellular network through the same eNB 308 or different eNBs 602, 604. In situations where the devices are communicating with a single eNB, the messaging can be directed to/from the eNB which facilitates the rerouting of communication from the first device to the second device. Where each device accesses the cellular network through a different eNB, the messaging is directed to the network which facilitates the rerouting of the communication from the first device through the first eNB to the second device through the second eNB. As a result, the eNB and cellular network are represented by a single block labeled "ENB/NW" 702. For the example of FIG. 8, the cellular network operates in accordance with at least one revision of the 3GPP LTE communication specification.

At event 802, at least one application is active on the first device using the cellular network 702. Depending on the particular circumstances, there may be more than one active application on the first device 102. For the examples herein, service is rerouted and transferred to the second device for a single device and any other active application remains with the current serving device. In some situations, more than one application may be transferred. Also, no active applications are running on the second device for the examples. In some situations, the second device may have one or more running applications. These applications may be transferred to the first device under some circumstances when the application running on the first device is transferred to the second device.

At event 804, the second device is in RRC_IDLE mode. In this mode and in accordance with LTE specifications, the UE device can receive broadcast or multi-cast data, monitors a paging channel to detect incoming calls, performs neighbor cell measurements and does cell selection as well as reselection and acquires system information.

At event 806, a change in proximity of the first device to the second device is detected. For the example, the second device detects that the first device has moved closer to the second device and is within a maximum threshold proximity. In some situations, the detection of a change in proximity may be a detection that the devices have moved farther apart. Also, the first device may detect the change in some circumstances.

At transmission 808, the second device initiates connection establishment by transmitting a message to the cellular network 702. The initiation is in response to the change proximity.

At transmission 810, the cellular network 702 and the second device establish the EPS bearer channels if not already established.

At transmission 812, the second device notifies the device manager 100 of the detected change in proximity. For the example, a notification message is sent through the Internet.

At event 814, the device manager 100 determines whether there is a need to transmit the active application from the first device to the second device. The device manager 100 applies the rules, preferences, and information regarding the current conditions and circumstances to determine if the service should be rerouted to the second device. For the example of FIG. 8, the device manager 100 determines that the service should be transferred.

The device manager 100 steers the application to the second device at transmission 816. An example of a suitable technique of steering the application includes defining elements within the header in addition to the conventional header of the IP packets used for the application. For such an example, three elements in the additional header are defined to represent the application identifier, a group identifier, and a device identifier. By relying on the conventional packet gateway (P-GW) for steering and rerouting of the IP packet, only the application layer within the device manager 100 and the devices 102, 104 needs to track and be aware of the additional header. For the examples herein, an application control layer is used by the device manager to inform the device to which the service has been transferred that that device is now the new master of the of the particular application that has been transferred. The application control layer is also used to inform the device from which service was transferred that it is no longer the master of the application. At event 818, the application continues on the second device.

Figure 9:
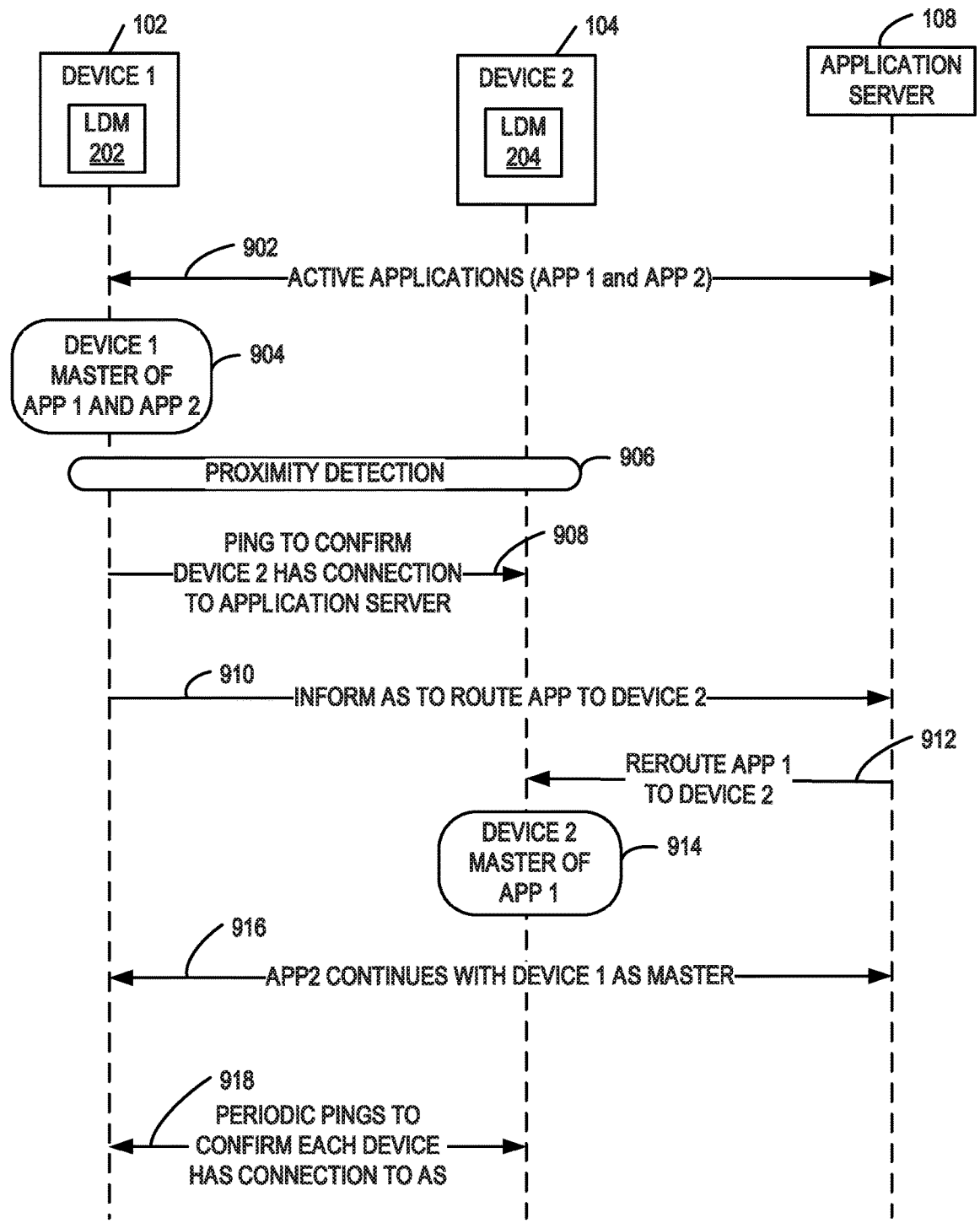
FIG. 9 is a message diagram for an example where the device manager is implemented as local device managers within the devices.

FIG. 9 is a message diagram for an example where the device manager 100 is implemented as local device managers 202, 204 within the devices 102, 104.

At event 902, communications are exchanged between the first device and the application server 108 to facilitate two active applications (App 1 and App 2).

At event 904, the first device is the master of both applications. Accordingly, the local device manager 202 is the master of the active applications.

At event 906, a change in proximity of the first device to the second device is detected. For the example, the first device detects that the second device has moved closer to the first device and is within a maximum threshold proximity. In some situations, the detection of a change in proximity may be a detection that the devices have moved farther apart. Also, the second device may detect the change in some circumstances.

At transmission 908, the first device pings the second device to confirm that the second device has a connection to the network. As described above, the ping provides a mechanism for confirming connection status to the network. In some situations, one device may broadcast it's link status in the discovery message. In other circumstances, the devices confirm each other's link-quality with the network during the proximity detection exchange protocol.

At transmission 910, the first device informs the application server 108 that one of the applications (APP 1) should be rerouted to the second device. The application control layer is also used to inform the device from which service was transferred that it is no longer the master of the application. However, in this case it's the device that informs the application control layer of the request to release its function as the master. In some situations, a subset of applications (Apps) is associated with the first device (device 1) and another subset is associated with the second device (device 2), and so on. In other implementations, each App is associated with each device and the priority of each device for each app is listed at the device manager. Table 1 provides illustrates such an example.

TABLE 1

|      | Device-1 | Device-2 |
|------|----------|----------|
| App1 | Master   | Slave    |
| App2 | Slave    | Master   |
| App3 | Master   | Slave    |

At event 912, the application server 108 reroutes the application to the second device.

At event 914, the second device becomes the master of the application (APP 1). For the examples herein, the control information used for rerouting the service is used to assign the second device as the master. In some circumstances, a confirmation message is sent by the second device indicating that it is accepting the role as the master.

At event 916, other applications that have not been rerouted (APP 2) continue to communication link with the first device with the first device as the master.

At event 918, the one or both of the devices pings the other device to confirm that each device has a connection to the network.

Figure 10:
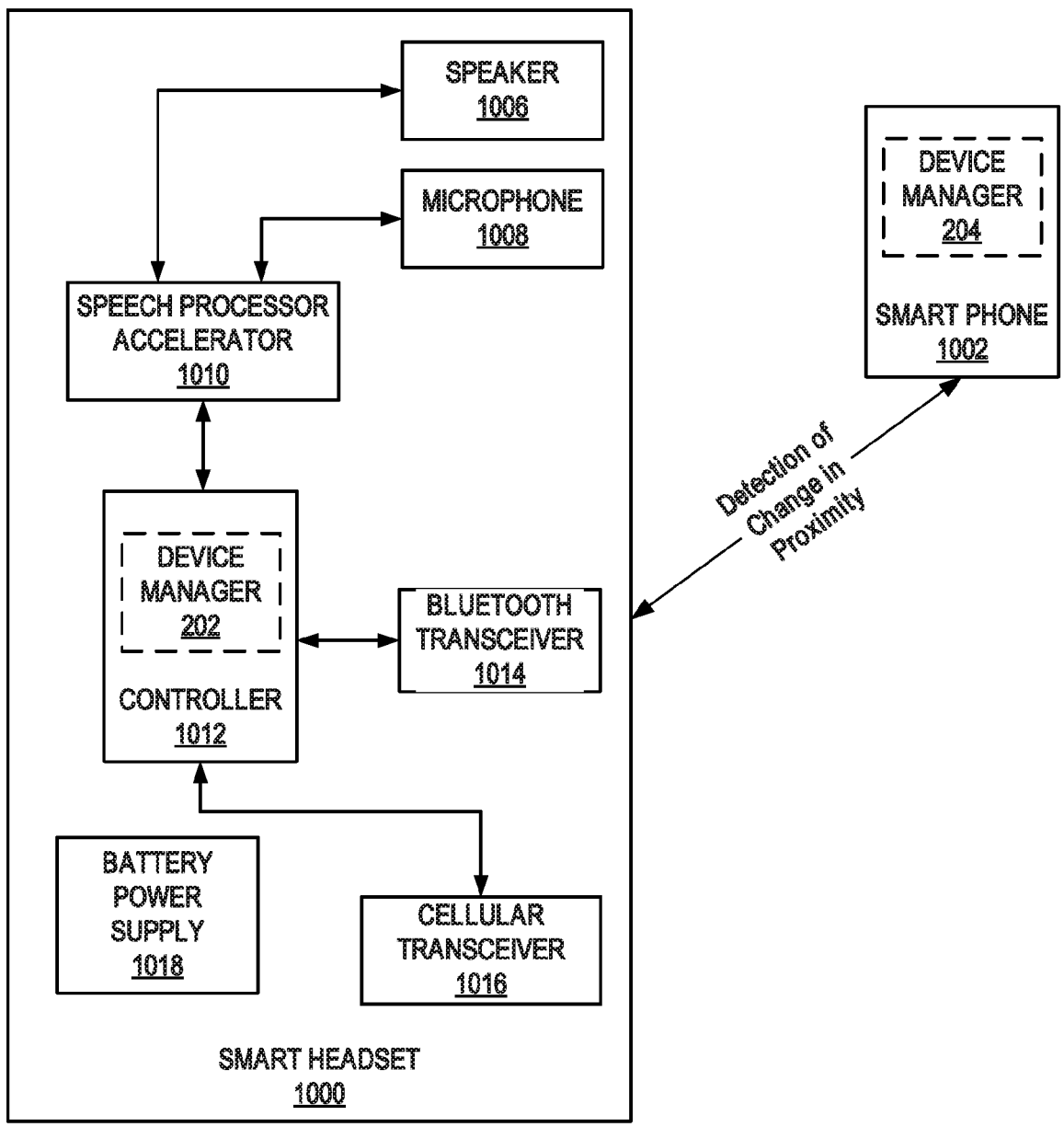
FIG. 10 is a block diagram of an example of smart headset suitable for use as the smart headset of FIG. 4 and FIG. 9.

FIG. 10 is a block diagram of an example of smart headset 1000 suitable for use as the smart headset of FIG. 4 and FIG. 9. The smart headset 1000 may also be used as one of the devices in other examples discussed herein. FIG. 10 shows the smart headset 1000 and a smart handset 1002 each having a local device manager 292, 204. The local device managers are illustrated with dashed line blocks to indicate that in some situations, one or both of the local device managers can be omitted.

The smart headset 1000 includes a speaker 1006, a microphone 1008, a speech processor accelerator 1010, a controller 1012, a Bluetooth transceiver 1014, a cellular transceiver 1016 and a batter power supply 1018. The speech processor accelerator 1010 preforms speech to text and text to speech conversion as well as other audio processor functions. The Bluetooth transceiver communicates with other devices such as the smart handset 1002 using Bluetooth techniques and signaling. The Bluetooth transceiver may also operate as a proximity detection device by detecting Bluetooth signals transmitted by other devices within the user group such as the smart headset. The cellular transceiver 1016 communicates with eNBs and, in some circumstances, other handsets using cellular communication techniques and signaling. For the example, the cellular transceiver operates in accordance with at least one revision of the 3GPP LTE communication specification. The controller 1012 facilitates the functions of the smart headset as described herein as well as facilitating the overall operation of the smart headset. The battery power supply 1018 supplies the power to the components of the smart headset.

The smart headset operates in at least two modes. In a first mode, the headset is a standalone cellular phone. In the second mode, the smart headset is a wireless (e.g., Bluetooth) headset wirelessly communicating with a smartphone, cell phone, multimode device, or other UE device. During the first mode, the smart headset can support incoming and outgoing voice calls with an eNB, text to speech for incoming messages, speech to text for outgoing messages, and speech recognition/translation for web access. In some situations, the smart headset may include a Wi-Fi interface for connecting to the network in addition to the cellular interface.

Smart headset and the smart handset may have the same phone number is some implementations. In other implementations, the devices may have different phone numbers.

During operation, a transfer of service may occur in response to either the smart headset or smart handset detecting a proximity change to the other device. In some cases, as discussed above with reference to FIG. 4, the cellular network may manage the transmission service between devices after being notified of a proximity change. Other network managing examples are discussed below with reference to FIG. 11 and FIG. 12.

When the smart handset is detected and is within range, the smart headset may autonomously connect to the smart handset via Bluetooth or may be directed to connect to handset. Service for one or more applications is transitioned from the headset to the handset.

In some situations, the smart handset 1002 is the master device that coordinates the rerouting of service between the smart phone and smart headset. In one example, all services go directly to the smart handset first and the smart handset forwards the appropriate services such as voice calls and test messages to the smart headset. In such an implementation, the network acts as forwarding entity.

Therefore, the exemplary smart headset includes the speaker configured to generate output sounds based on received information received at the smart headset. The microphone is configured to generate microphone signals, based on input sounds, to form transmission information for transmitting from the smart headset. The cellular transceiver is configured to wirelessly communicate with the cellular communication network and the Bluetooth transceiver is configured to wirelessly communicate with another device such as the smart handset. The controller is configured to place the smart headset in a selected operation mode of at least two modes comprising a first mode and a second mode. The smart headset communicates through the cellular transceiver with the cellular network when the smart headset in the first mode such that the received information is received from the cellular network through the cellular transceiver and the transmission information is transmitted to the cellular network through the cellular transceiver. The smart headset communicates through the Bluetooth transceiver with the smart handset when the smart headset is in the second mode such that the received information is received from the smart handset through the Bluetooth transceiver and the transmission information is transmitted to the smart handset through the Bluetooth transceiver. The controller is configured to place the headset in the first mode when the smart handset is determined to be farther than a maximum proximity from the smart handset and configured to place the headset in the second mode when the smart handset is determined to be within the maximum proximity to the smart headset. In one example, the controller determines whether the smart handset is within the maximum proximity based on short-range signals transmitted by the smart handset. Some examples of suitable short-range signals include Bluetooth, and Zig-bee signals.

Where the communications include text messages, the speech processor accelerator is configured to convert received text information of the received information to speech forming the output sounds and is configured to convert the microphone signals to transmission text information forming the transmission information.

Figure 11:
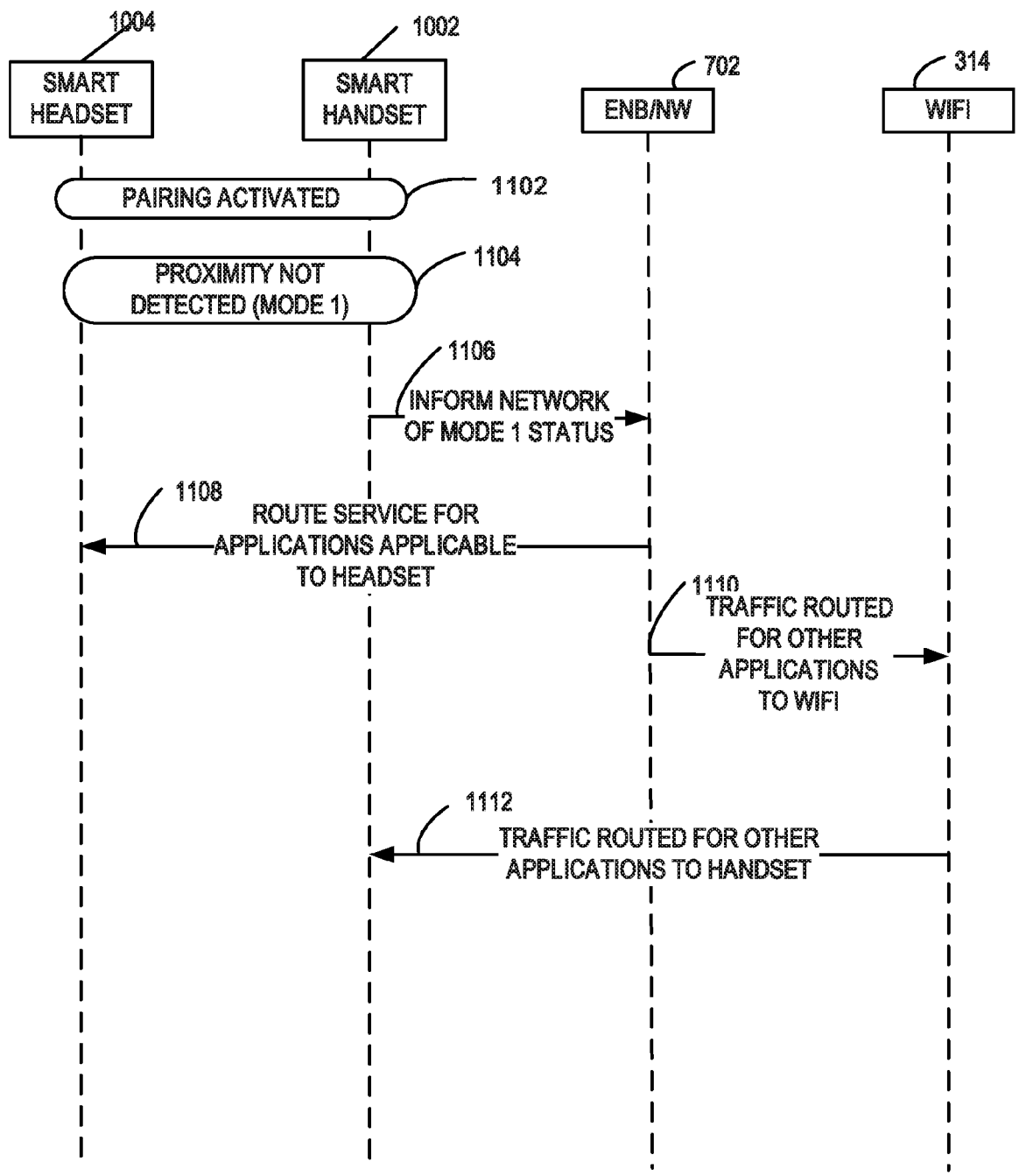
FIG. 11 is a message diagram for an example when the smart headset is in Mode 1.

FIG. 11 is a message diagram for an example when the smart headset is in mode 1. For the example of FIG. 11, services to the smart handset are routed via Wi-Fi. In some situations, the services may be routed via LTE.

At event 1102, pairing is activated. As a result, the smart headset and smart handset attempt to detects and connect to each other.

At step 1104, neither the headset nor the handset can detect the other device. As a result, the smart headset is in Mode 1 where it can handle some applications directly with the network.

At transmission 1106, the smart handset informs the network 702 that the handset and headset are on Mode 1. The smart handset sends a notification message. In some situations, the smart headset notifies the network.

At event 1108, the services for application applicable for the smart headset in Mode 1 are routed to the smart headset. Accordingly, services for voice calls and text messages that can be handled by the smart headset are routed to the smart headset.

At event 1110, traffic for other applications that cannot be handled by the smart headset is routed to the Wii network. The Wi-Fi network then routes the traffic to the smart handset.

Figure 12:
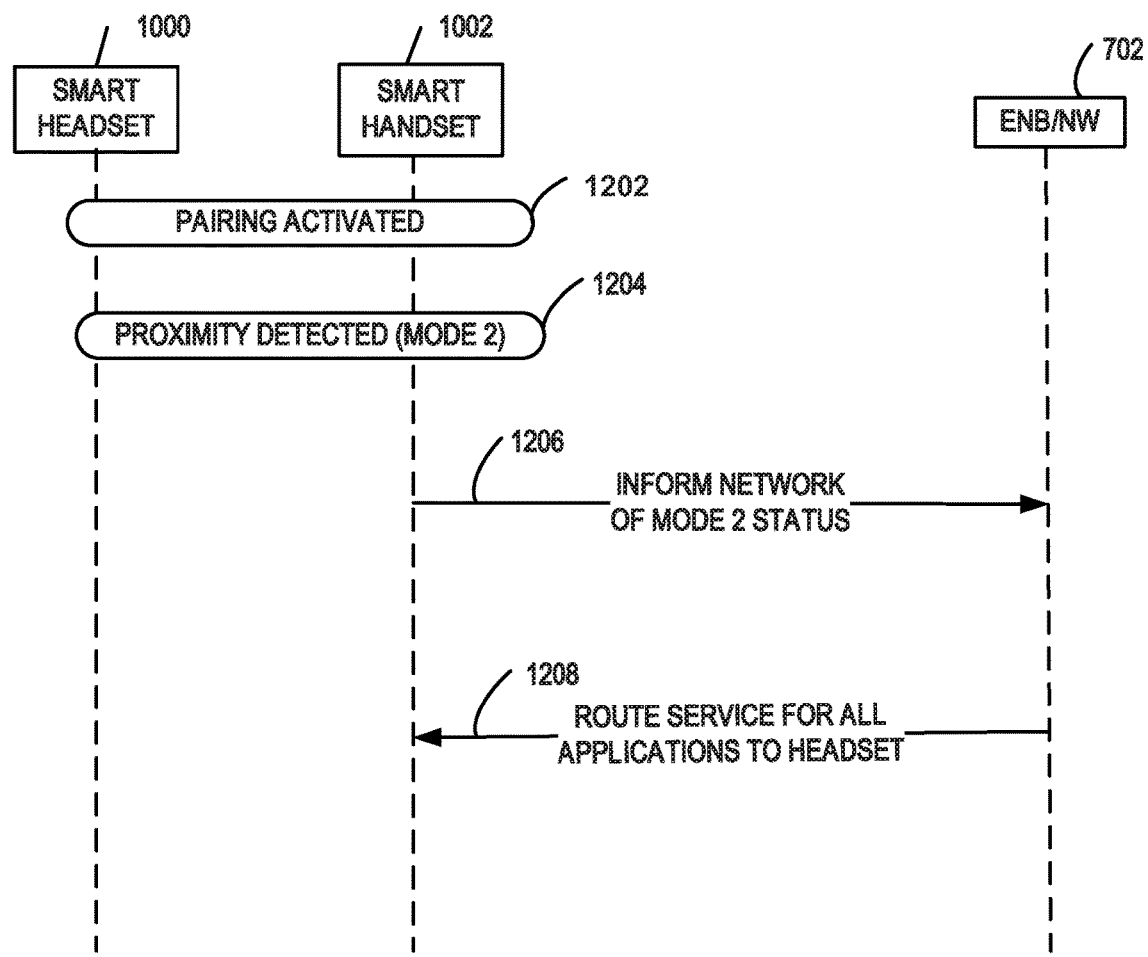
FIG. 12 is a message diagram for an example when the smart headset is in Mode 2.

FIG. 12 is a message diagram for an example when the smart headset is in Mode 2.

At event 1202, pairing is activated. As a result, the smart headset and smart handset attempt to detect and connect to each other.

At step 1204, at least one of the headset or the handset detect the other device. As a result, the smart headset is in Mode 2 where it connects to the smart handset as a peripheral Bluetooth headset device.

At transmission 1206, the smart handset informs the network 702 that the handset and headset are in Mode 2.

At event 1208, the services for all applications are routed to the smart handset.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A smart headset comprising:
   a speaker configured to generate output sounds based on received information received at the smart headset;
   a microphone configured to generate microphone signals, based on input sounds, for forming transmission information transmitted from the smart headset;
   a cellular transceiver configured to wirelessly communicate with a cellular communication network;

a Bluetooth transceiver configured to wirelessly communicate with a smart handset; and
a controller configured to place the smart headset in a selected operation mode of at least two modes comprising a first mode and a second mode,
the smart headset communicating through the cellular transceiver with the cellular communication network when the smart headset is in the first mode such that the received information is received from the cellular communication network through the cellular transceiver and the transmission information is transmitted to the cellular communication network through the cellular transceiver,
the smart headset communicating through the Bluetooth transceiver with the smart handset when the smart headset is in the second mode such that the received information is received from the smart handset through the Bluetooth transceiver and the transmission information is transmitted to the smart handset through the Bluetooth transceiver,
the controller configured to place the smart headset in the first mode when the smart handset is determined to be farther than a maximum proximity from the smart headset and configured to place the smart headset in the second mode when the smart handset is determined to be within the maximum proximity to the smart headset.

2. The smart headset of claim 1, wherein the controller is configured to determine whether the smart handset is within the maximum proximity based on short-range signals transmitted by the smart handset.

3. The smart headset of claim 2, wherein the short-range signals are Bluetooth signals.

4. The smart headset of claim 1, further comprising a speech processor accelerator configured to convert received text information of the received information to speech forming the output sounds and configured to convert the microphone signals to transmission text information forming the transmission information.

5. The smart headset of claim 1, wherein the controller is configured to place the smart headset in the first mode and the second mode based on an instruction received from the cellular communication network.

6. The smart headset of claim 1, wherein the Bluetooth transceiver is further configured to receive a link quality request message from the smart handset requesting the smart headset to confirm a quality of a communication path.

7. The smart headset of claim 6, wherein the cellular transceiver is further configured to transmit a transmission to the cellular communication network in response to the link quality request message.

8. A method comprising:
pairing a smart headset with a smart handset, the smart headset comprising a cellular transceiver and a Bluetooth transceiver;
detecting, by one of the smart headset and the smart handset, whether the smart headset is within a maximum proximity of the smart handset; and
operating the smart headset in a first mode when the smart headset is not within a maximum proximity of the smart handset, the first mode comprising the smart headset communicating through the cellular transceiver with a cellular communication network;
operating the smart headset in a second mode when the smart headset is within the maximum proximity of the smart handset, the second mode comprising the smart headset communicating through the Bluetooth transceiver with the smart handset.

9. The method of claim 8, further comprising:
switching from the first mode to the second mode when the proximity changes from being outside the maximum proximity to within the maximum proximity.

10. The method of claim 8, further comprising:
switching from the second mode to the first mode when the proximity changes from being within the maximum proximity to outside the maximum proximity.

11. The method of claim 8, further comprising:
transmitting, by one of the smart handset and the smart handset, a notification that identifying the mode being used by the smart headset;
routing traffic from the cellular communication network to the smart headset when the smart headset is in the first mode; and
routing traffic from the cellular communication network to the smart handset when the smart headset is in the second mode.

12. A user device comprising:
a cellular transceiver configured to wirelessly communicate with a cellular communication network;
a Bluetooth transceiver configured to wirelessly communicate with another user device;
a controller configured to place the user device in a selected operation mode of at least two modes comprising a first mode and a second mode,
the user device communicating through the cellular transceiver with the cellular communication network when the user device is in the first mode such that the cellular transceiver of the user device is configured to:
receive information from the cellular communication network through the cellular transceiver, and
transmit information to the cellular communication network through the cellular transceiver,
the user device communicating through the Bluetooth transceiver with the another user device when the user device is in the second mode such that the Bluetooth transceiver of the user device is configured to:
receive information from the another user device through the Bluetooth transceiver, and
transmit information to the another user device through the Bluetooth transceiver,
the controller further configured to place the user device in the first mode when the another user device is determined to be farther than a maximum proximity from the user device and configured to place the user device in the second mode when the another user device is determined to be within the maximum proximity to the user device; and
a transmitter configured to:
transmit a notification message to notify the cellular communication network that the user device is operating in the first mode when the another user device is determined to be farther than a maximum proximity from the user device, and
transmit a notification message to notify the cellular communication network that the user device is operating in the second mode when the another user device is determined to be within the maximum proximity to the user device.

13. The user device of claim 12, wherein the user device comprises a wearable user device.

14. The user device of claim 13, wherein the wearable user device comprises a smart headset.

15. A user device comprising:
a Bluetooth transceiver configured to wirelessly communicate with another user device when the another user device is in a selected operation mode of at least two modes comprising a first mode and a second mode, the another user device communicating through a cellular transceiver with a cellular communication network when the another user device is in the first mode, the another user device communicating through a Bluetooth transceiver with the user device when the another user device is in the second mode such that the Bluetooth transceiver of the user device is configured to:

receive information from the another user device through the Bluetooth transceiver, and transmit information to the another user device through the Bluetooth transceiver; and a transmitter configured to:

transmit a notification message to notify the cellular communication network that the another user device is operating in the first mode when the user device is determined to be farther than a maximum proximity from the another user device, and transmit a notification message to notify the cellular communication network that the another user device is operating in the second mode when the user device is determined to be within the maximum proximity to the another user device.

16. The user device of claim 15, wherein the user device comprises a smart handset.

\* \* \* \* \*